United States Patent [19]

Lisle et al.

[11] 4,368,468
[45] Jan. 11, 1983

[54] MONOPULSE RADIO RECEIVER COMPENSATION APPARATUS

[75] Inventors: Hampton H. Lisle, Crownsville, Md.; Kevin DeMartino, Andover, Mass.

[73] Assignee: Westinghouse Electric Corp., Pittsburgh, Pa.

[21] Appl. No.: 219,094

[22] Filed: Dec. 22, 1980

[51] Int. Cl.$^3$ .................... G01S 13/44; G01S 7/40
[52] U.S. Cl. .................... 343/16 M; 343/17.7
[58] Field of Search .................... 343/16 M, 17.7

[56] References Cited

U.S. PATENT DOCUMENTS

| | | | |
|---|---|---|---|
| 3,618,092 | 11/1971 | Waino | 343/16 M |
| 3,778,829 | 12/1973 | Longuemare, Jr. et al. | 343/16 M |
| 3,794,998 | 2/1974 | Pearson, Jr. et al. | 343/16 M |
| 3,883,870 | 5/1975 | Kunz | 343/17.7 |
| 3,950,750 | 4/1976 | Churchill et al. | 343/17.7 |
| 3,969,726 | 7/1976 | Birleson | 343/16 M |
| 3,977,000 | 8/1976 | Wagner | 343/16 M |
| 4,003,054 | 1/1977 | Goldstone | 343/17.7 |
| 4,005,421 | 1/1977 | Dax | 343/16 M |
| 4,136,343 | 1/1979 | Heffner et al. | 343/16 M X |
| 4,160,975 | 7/1979 | Steudel | 343/16 M |
| 4,225,865 | 9/1980 | McPherson | 343/17.7 X |

OTHER PUBLICATIONS

Gellekink; Monopulse Radar with Pilot Signal Generator; WIPO 80/02326; Oct. 1980.

*Primary Examiner*—T. H. Tubbesing
*Attorney, Agent, or Firm*—W. E. Zitelli

[57] ABSTRACT

In a monopulse radar receiver especially having off-boresite processing for a multiple target capability, there is included apparatus for compensating the receiver derived centroid and extent related signals for post hybrid interchannel imbalances in accordance with system parameter states. Generally, there is included in the sum and difference channel pairs of a monopulse radar receiver, attenuators which are operative in a plurality of attenuation states wherein a different error in the centroid and extent related signals may be rendered for each attenuation state. The compensating apparatus included in the receiver derives compensating signals for each of the attenuation states and stores the derived signals for use in compensating the centroid and extent related signals computed under mutually related attentuation conditions. Some monopulse radars additionally include carrier frequency diversity wherein a different error may be imposed on the centroid and extent related signals due to the post hybrid computations of the plurality of carrier frequencies. Consequently, the compensating apparatus, for these cases, further includes a means for deriving compensating signals associated with each of the carrier frequencies of the plurality which may be stored in another memory or memory section for compensating the centroid and extent related signals computed in the receiver in accordance with the carrier frequencies mutually associated therewith.

13 Claims, 6 Drawing Figures

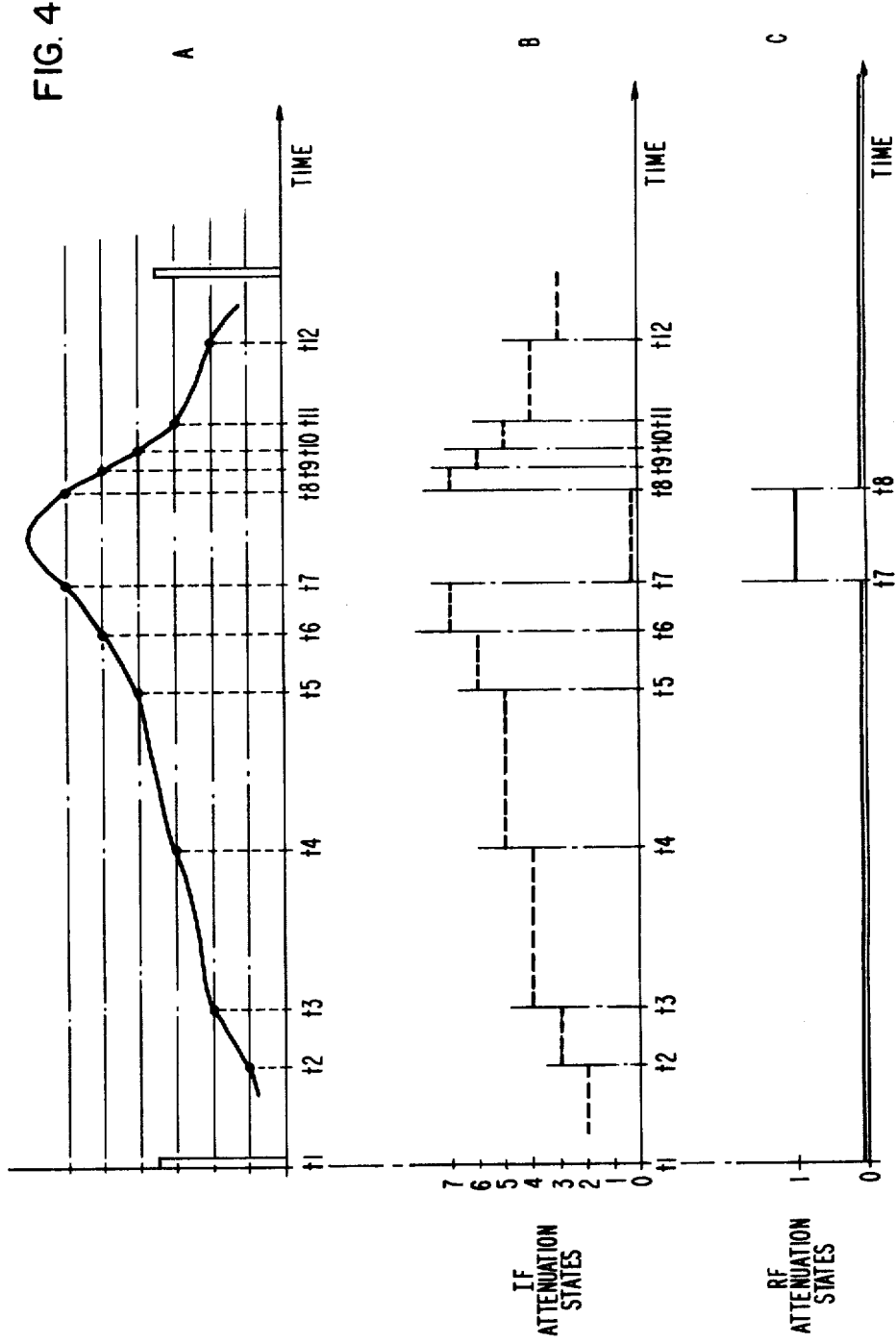

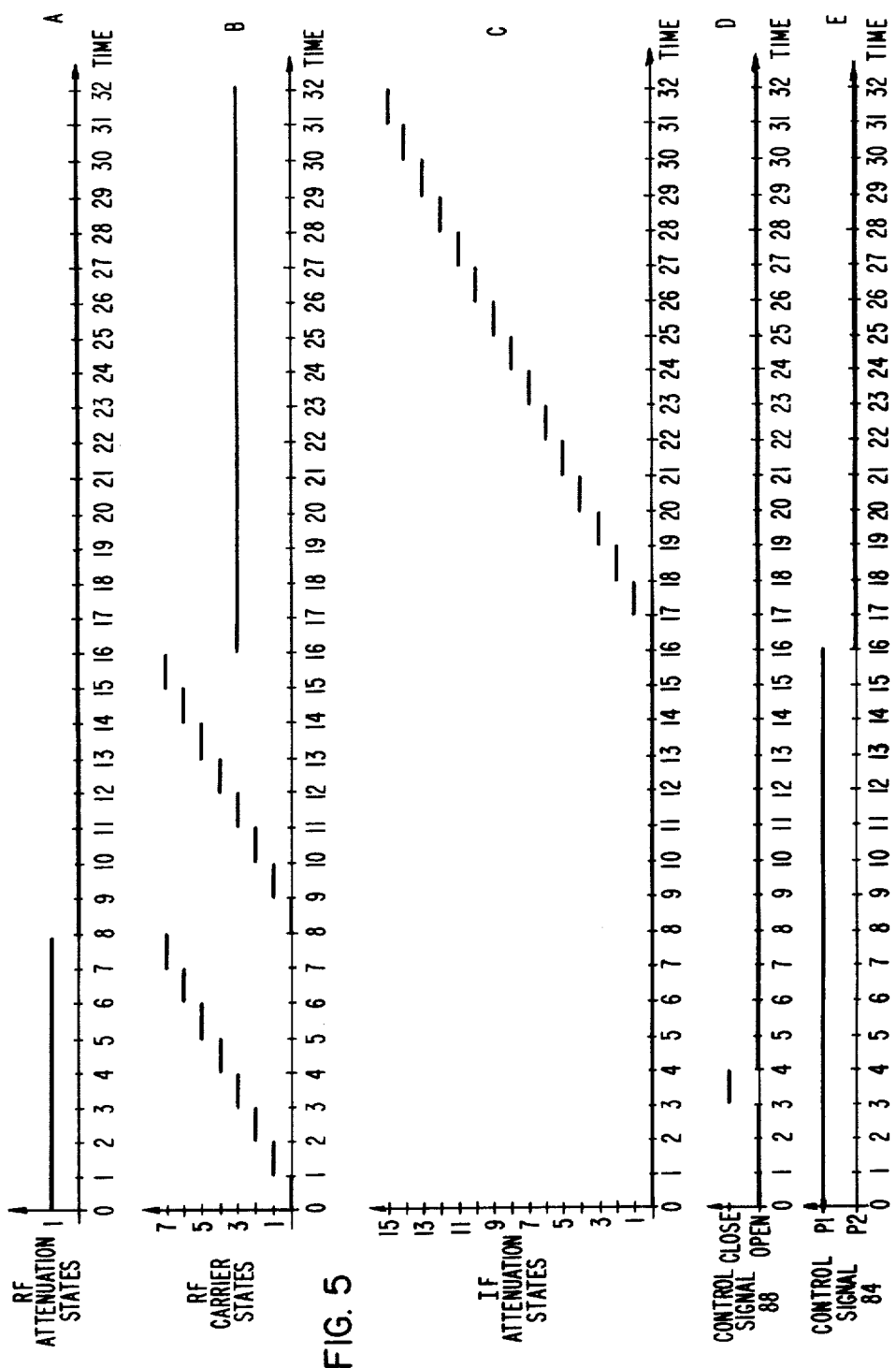

MONOPULSE RADIO RECEIVER COMPENSATION APPARATUS

GOVERNMENT CONTRACT CLAUSE

The Government has rights in this invention pursuant to Contract No. F33615-74-C-1040 awarded by the Department of the Air Force.

BACKGROUND OF THE INVENTION

The present invention relates to monopulse radar receivers having off-boresight processing for multiple target capability, and more particularly, to apparatus included therein for compensating the receiver derived centroid and extent related signals for post-hybrid inter channel imbalances in accordance with receiver parameter states.

Until recently, monopulse radars have operated by "servo"ing an antenna such that a detected target was centered or nulled about the boresight axis of the antenna difference pattern. Under these circumstances, the actual angles-off-boresight in both azimuth and elevation were kept relatively small, and therefore, the effect of sum-difference ($\Sigma - \Delta$) phase and gain post-hybrid receiver channel imbalances was generally considered not a problem. Nonetheless, systems for correcting errors due to channel imbalance have been proposed for some monopulse radar receivers. An example of such an error correction system is disclosed in the U.S. Pat. No. 3,794,998, issued to Earl C. Pearson, Jr. et al. on Feb. 26, 1974. Correction systems of this type dealt primarily with single threat detection wherein the monopulse radar receiver derived azimuth and elevation angle errors off-boresight and "servo"ed the antennas to null these errors, thereby always keeping the computed angle error quite small.

In the case where multiple target capability in monopulse radars is required, like in terrain following and terrain avoidance radar operations, for example, the off-boresight null processing can no longer be used effectively. Rather, a complex number representative of the multiple target scatterings is derived as part of the post-hybrid interchannel processing of the radar receiver. This complex number is a measure of the centroid and extent of the multiple targets detected in any given range cell of the radar beam. In these radar applications, the effect of interchannel post-hybrid imbalances are of greater significance because of the accuracy required in the computations of the complex measurements. Note that in these radars having multiple target capabilities, there exists no nulling of off-boresight angle measurements, and as a result, the true multiple target off-boresight measurements representative of centroid and extent are absolutely processed. Consequently, even the smallest imbalance between channels may pose significant inaccuracies in the target related measurements.

Examples of the effects of interchannel imbalance between a sum channel and one of the difference channels of a typical monopulse radar receiver, like the one depicted in the block diagram schematic embodiment of FIG. 2, for example, which will be described in greater detail herebelow, are provided by the graphs of FIGS. 1A and 1B. Illustratively, it is shown that the errors in the centroid and extent target measurements appear to increase in proportion to the amount of gain and phase imbalance between the channels and the computed centroidal angle off-boresight. For example, with an imbalance of 0.5 db in gain and 4° in phase between channels and for a target centroidal angle calculated at about one-half beam width centroid errors on the order of 0.02 beamwidth and extent errors on the order of 0.04 beamwidth may be anticipated.

In FIG. 2 is a schematic block diagram of an embodiment of a basic monopulse radar receiver having multiple target capabilities for computing angular measurements in either one of a given azimuth or elevation direction. Referring to FIG. 2, blocks 10 and 12 are representative of horns of a conventional antenna for receiving reflected signal from one or more targets in the beam direction of the radar. A monopulse hybrid unit 14 may include a combination of microwave couplers arranged conventionally to accept the received signals from the antenna horns 10 and 12 and to process them into suitable sum ($\Sigma$) and difference ($\Delta$) signals which are provided to respective channels of a sum and difference channel pair denoted as 16 and 18, respectively. Each channel 16 and 18 of the pair includes, in cascade, an RF assembly 20, a mixer 21a or 21b and a IF assembly 22. The RF and IF assemblies 20 and 22, respectively, each include at least one stage of amplification (not shown) and one or more attenuators, generally preceding the amplifiers in each assembly, the attenuators being denoted as 24 in the RF assembly 20 and as 25 in the IF assembly 22. The pair of channel outputs of the IF asembly 22 may be coupled to an analog-to-digital (A/D) converter 26 of a conventional variety for digitization and thereafter, provided to a processing section 28 wherein a complex signal, representative of the centroid and extent of a scattering of detected targets in a range cell, may be derived. For a better understanding of the construction and operation of typical monopulse radars, reference is made to the text "Radar Handbook" by M. I. Skolnik, published by McGraw-Hill Book Company, New York, NY (1970), pages 11-21 to 21-25, approximately.

More specifically, the monopulse radar processor 28 may include: a conjugate functional block 30 coupled to the difference channel output $\Delta$ of the A/D converter 26; a conventional multiplier 32 for multiplying the sum channel output $\Sigma$ of the A/D converter 26 with the $\Delta$ conjugate ($\Delta^*$) output of the block 30; an absolute squaring functional block 34 which operates on the sum ($\Sigma$) signal output of 26; and, a conventional divider unit 36 for dividing the output of the multiplier 32 with the output of the block 34. The resulting signal, denoted mathematically by $\Delta^*\Sigma/|\Sigma|^2$, may be output from the processing block 28 over signal line 28 for further processing downstream where the real part thereof may be used to determine the centroid and the imaginary part thereof may be used to determine the extent for a collection of target scatters related to a range cell within the radar beamwidth.

In addition to the elements just described, some monopulse radar receivers also include a microwave coupler 40 which permits the coupling of a calibration pilot signal into the output feed of one of the horns 12, for example, of the radar antenna. In some cases, an attenuator 42 may be disposed in the receiver for adjustment of the level of the calibration signal prior to coupling into the output of the horn 12. The calibration pilot signal is generally supplied to the radar receiver for the purposes of providing a fixed reference signal in both channel 16 and 18 for calibration of the various amplifiers, mixers and converters included therein.

In most receivers, the attenuators, denoted at 24 and 25, disposed in the RF and IF assemblies 20 and 22, respectively, may be operated in a variety of states in response to the amplitude level of the channel signals correspondingly associated therewith in order to keep the amplifiers, mixers and converters of the receiver operating close to their limited full dynamic range. Control signals may be supplied over signal lines 44 and 46 to set the attenuators 24 and 25, respectively, into their various operating attenuation states. It should be appreciated that with each different attenuation state, there may exist a corresponding interchannel imbalance between the sum 16 and difference 18 channels which respectively result in a like number of imbalance errors in the computed complex signal $\Delta^*\Sigma|\Sigma|^2$.

Going even further, some more sophisticated monopulse radars employ frequency diversity in the radar transmissions thereof. In these cases, the RF assembly elements may exhibit different complex interchannel imbalances at each transmission frequency. Accordingly, each RF state may also result in a corresponding imbalance error in the computation of the complex signal related to the centroid and extent measurements of the receiver.

In conclusion, then, any compensation of calibration system which may be proposed to negate post-hybrid interchannel imbalance errors in multiple target receiver off-boresight computations should take into account all the unavoidable receiver parameter states described supra. Apparently, earlier compensation systems, like the one disclosed in the aforementioned U.S. Pat. No. 3,794,998, for example, have not dealt with the variety of interchannel imbalances as resulting from RF transmission diversity and RF and IF assembly attenuator settings.

SUMMARY OF THE INVENTION

A monopulse radar receiver generally has at least one sum and difference channel pair for conditioning received target echo signals, each channel comprising at least one attenuator operative in a plurality of attenuation states. Further included is a processor for computing from the conditioned echo signals of the at least one sum and difference channel pair a plurality of first signals correspondingly related to the attenuation states of the channel pair. In accordance with the present invention, an improvement is included which comprises a first means for injecting a pilot signal into both channels of the at least one pair, a second means for setting the at least one attenuator on each of the channels to a plurality of attenuation states, and a third means for deriving a plurality of second signals from the sum and difference channel signals resulting from the injected pilot signal, the derived second signals being correspondingly related to the attenuation states set by the second means. Additionally included in the improvement is a memory, coupled to the third means, for storing the derived second signals into corresponding memory cells. A fourth means disposed in the receiver compensates the computed first signals with correspondingly stored second signals selected from the memory in accordance with commonly related attenuation states.

More specifically, each of the sum and difference channels of the at least one pair includes an RF assembly and an IF assembly each including at least one attenuator operative in a plurality of attenuation states. Accordingly, the second means may include means for setting independently the RF and IF attenuators to a plurality of attenuation states and the third means may include means for deriving a first plurality of second signals which are correspondingly related to the plurality of RF attenuation states and a fixed IF attenuation state; and a second plurality of second signals which are correspondingly related to a plurality of IF attenuation states and a fixed RF attenuation state. For storage purposes then, the memory includes a first memory for storing the first plurality of second signals into corresponding memory cells and a second memory for storing the second plurality of second signals into corresponding memory cells. In accordance with this more specific aspect of the invention, the fourth means includes means for selecting a stored second signal from each of the first and second memories based on the RF and IF attenuation states related to the computation of a first signal, and means for compensating the related first signal with the selected signals to form a compensated first signal.

In another aspect of the invention, the monopulse radar receiver is operative to receive target echo signals of a plurality of carrier frequencies in which case the processor computes from the conditioned echo signals of the at least one sum and difference channel pair a plurality of first signals correspondingly related to the received echo signal carrier frequencies. In this inventive aspect, the improvement comprises the first means for injecting a pilot carrier frequency signal onto both channels of the at least one pair, a second means for setting the carrier frequency of the pilot signal to various carrier frequency states which are correspondingly related to the carrier frequencies of the plurality, and third means for deriving a plurality of second signals from the sum and difference channel signals of the at least one pair resulting from the injected pilot carrier frequency signal, the derived second signals being correspondingly related to the carrier frequency states set by the second means. Further included in this improvement is a memory, coupled to the third means, for storing the derived second signals into corresponding memory cells and a fourth means which is disposed in the receiver for compensating the computed first signals with correspondingly stored second signals selected from the memory in accordance with commonly related carrier frequency states.

It is understood that the two inventive aspects above may be combined to form a third aspect of the invention which compensates the first signals with second signals derived from both the carrier frequency and attenuation states of the receiver. More specifically, in regard to this third aspect of the invention, a deriving means is included in the receiver improvement for deriving first and second pluralities of second signals from the sum and difference channel signals of the at least one pair resulting from the injected pilot signal. The derived first plurality of second signals are correspondingly related to the carrier frequency states set by the setting means and the derived second plurality of second signals are correspondingly related to the attenuation states set by the associated setting means. Further included are a first memory, coupled to the deriving means for storing the derived first plurality of second signals into corresponding memory cells based on the carrier frequency states of the first plurality, and a second memory, coupled to the deriving means, for storing the derived second plurality of second signals into corresponding memory cells based on the attenuation states of the second plurality. Further included is a means for compensating the computed first signals with correspondingly stored second signals selected from the first and second memories in accordance with respective commonly related carrier frequency and attenuation states.

BRIEF DESCRIPTION OF THE DRAWINGS

FIG. 4 includes exemplary time waveforms A, B and C which are used in describing the operation of a monopulse radar receiver especially in connection with the setting of the RF and IF attenuation states thereof; and FIG. 5 includes the time waveforms A, B, C, D and E which are used compositely to describe a sequential operational example for the compensation factors in connection with the embodiment of FIG. 3.

DESCRIPTION OF THE PREFERRED EMBODIMENTS

Figure 1A:
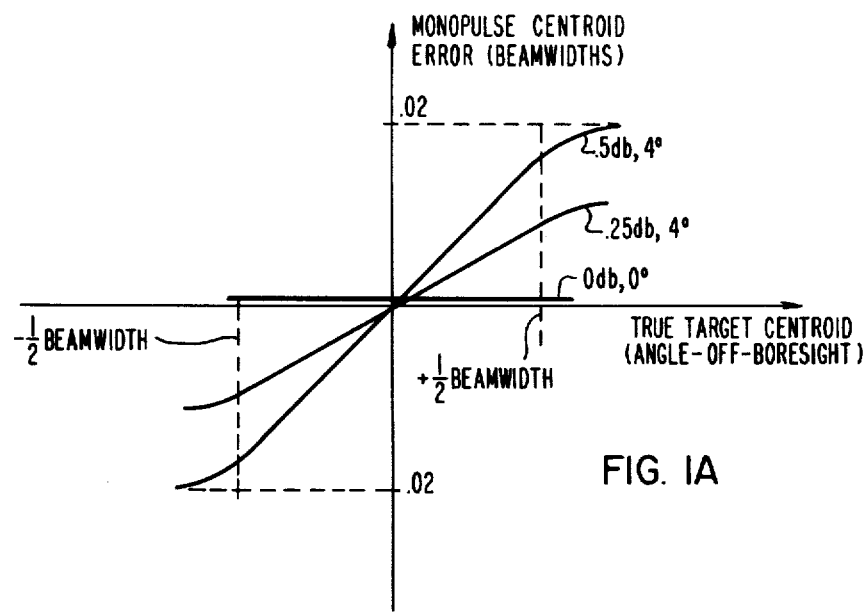
FIGS. 1A and 1B are exemplary graphs illustrating the monopulse centroid and extent errors which may be anticipated for a variety of interchannel gain and phase balances.
Figure 1B:
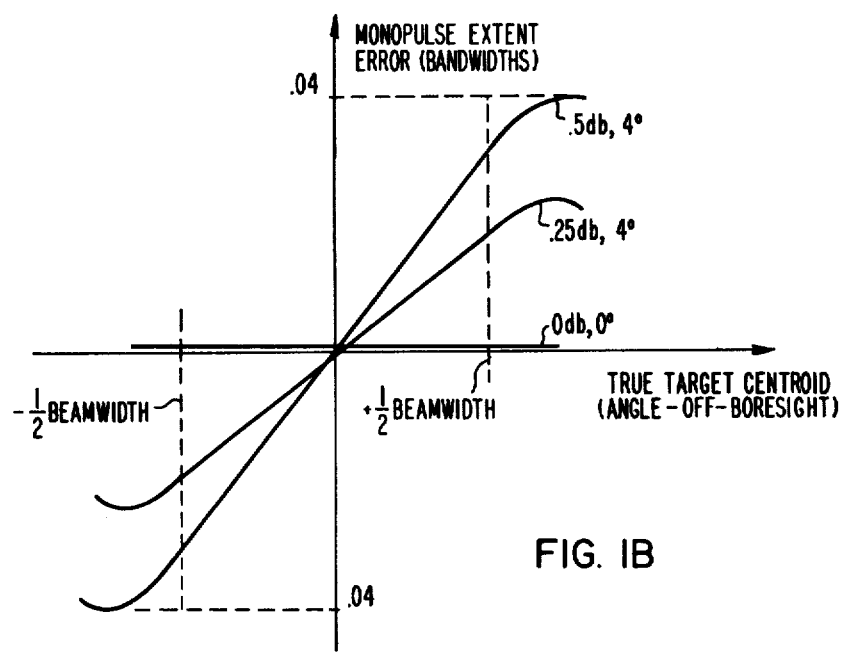
Figure 2:
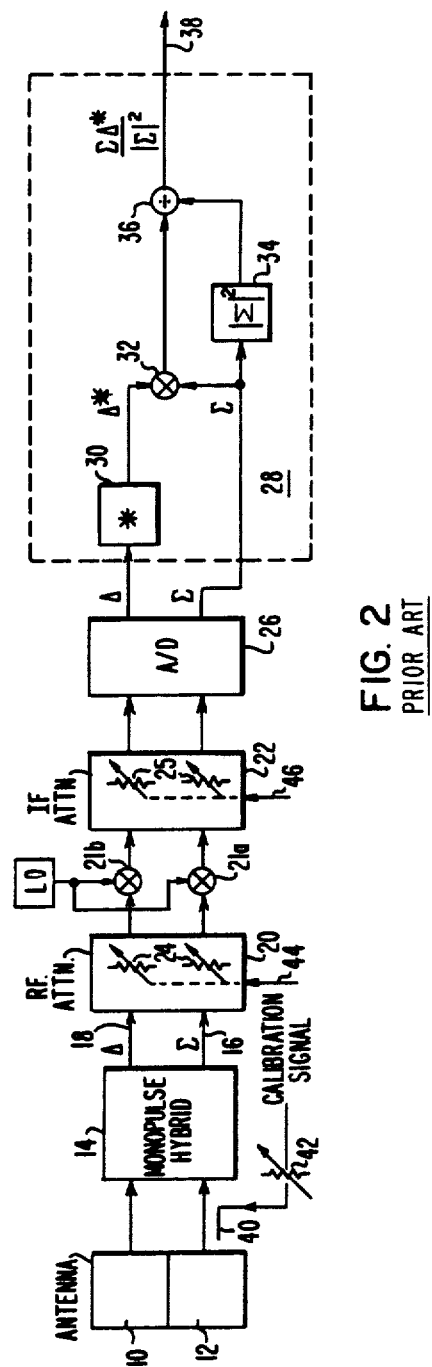
FIG. 2 is a schematic block diagram embodiment of a basic monopulse radar receiver with multiple target capability for computing angular measurements in either one of a given azimuth or elevation direction.
Figure 3:
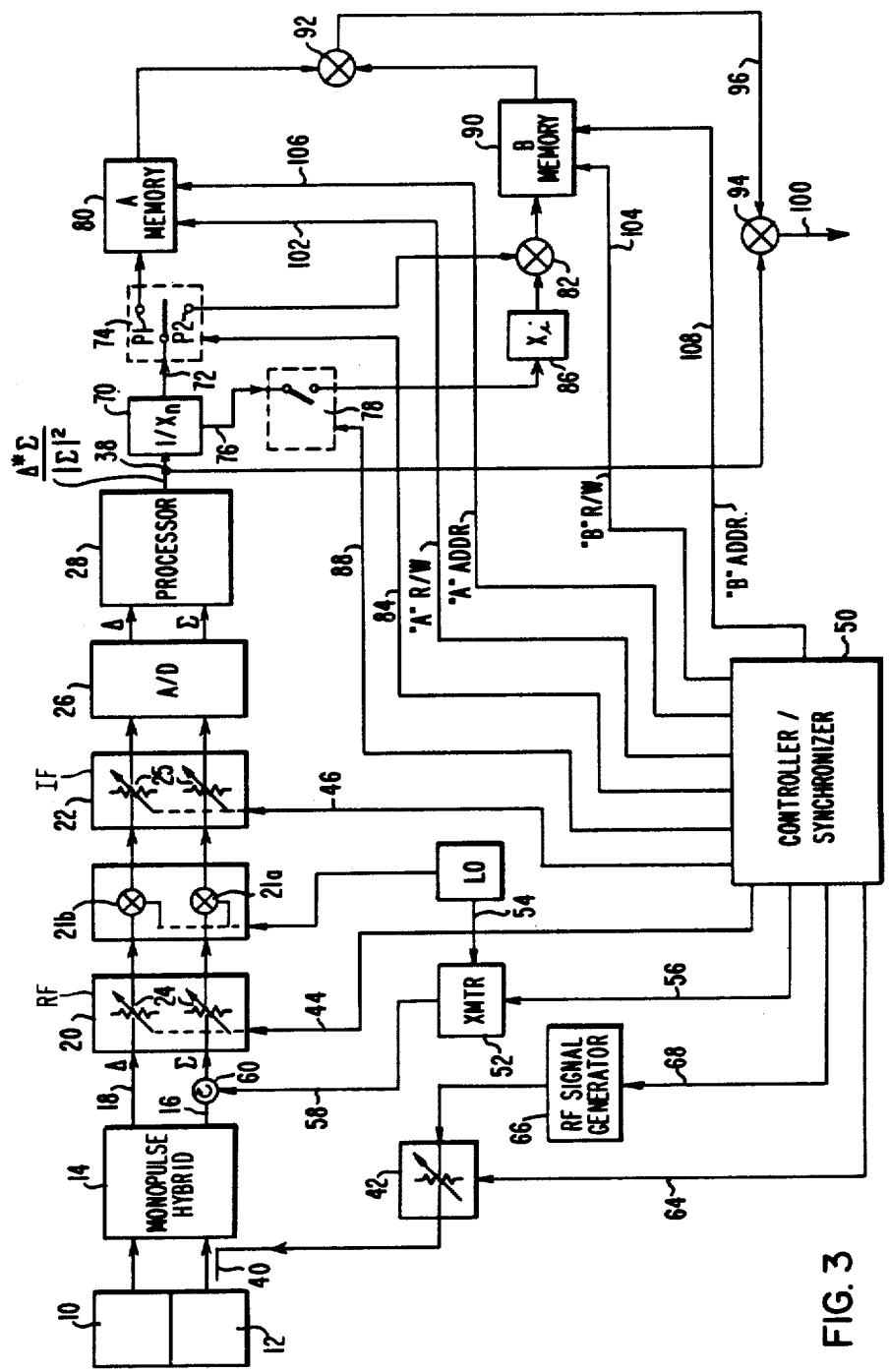
FIG. 3 is a schematic block diagram of a basic monopulse radar receiver suitable for embodying the principles of the present invention.

A suitable block diagram schematic embodiment for the present invention is shown in FIG. 3. Many of the elements included therein have already been described in connection with the conventional monopulse radar receiver embodiment of FIG. 2. The majority of the remaining elements then comprise a compensating system improvement especially for correcting interchannel imbalances. The elements which have been described in connection with the embodiment of FIG. 2 are the antenna horns 10, 12, the monopulse hybrid 14, the sum and difference channels 16 and 18, the RF assembly 20 which may include at least one attenuator 24 in each channel, at least one mixer 21a and 21b for each channel, an IF assembly 22 which may include at least one attenuator 25 for each sum and difference channel, and an A/D converter 26 for digitizing the signals from the sum and difference channels which are provided to a processor 28 for computing therefrom a complex signal representative of the centroid and extent of detected targets. The control signals 44 and 46 which may be used to set the attenuation states of the attenuators 24 and 25, respectively, may be provided from a conventional controller/synchronizer unit 50 which may be configured in a similar manner to that of the controller 30 described in connection with the aforementioned U.S. Pat. No. 3,794,998, referenced supra. In addition, a local oscillator denoted as LO may be used conventionally to provide the appropriate mixing signal to the mixers 21a and 21b for the heterodyning operation performed therein.

An additional element, the transmitter 52 included in the block diagram schematic embodiment of FIG. 3, may not be a part of the radar receiver, but rather functions in conjunction therewith. Generally, the transmitter 52 receives clocking signals 54 from the local oscillator LO and may be governed by the controller/synchronizer 50 via line 56 to provide a transmitting signal over signal line 58. A circulator 60 may be disposed in the summation channel 16 for linking the transmitting signal over line 58 to the monopulse hybrid 14 and antenna horns 10 and 12 for transmission into a spatial region.

The operation of a conventional monopulse radar receiver is generally well known. However, for completeness, a brief description of a typical operation will be provided so that a better appreciation of the principles of the present invention may be obtained. The waveforms A, B and C of FIG. 4 may be used in connection with the operational description here provided.

Commonly, at some given time, say t1, for example, the control unit 50 may govern the transmitter 52 to emit a pulse of the carrier frequency over signal line 58, through circulator 60, hybrid unit 14 and antenna horns 10 and 12. This signal thus will be transmitted into a spatial region as determined by the azimuth and elevation direction of the antenna beam. Target echo signals which may be received during an interpulse period, that is, between pulse transmissions, may appear in signal level as that shown by the waveform A in FIG. 4. As the target echo signals are received by the antenna 10 and 12, they are processed by the monopulse hybrid 14 into sum and difference signals which are provided over the respectively corresponding channels 16 and 18. The sum and difference signals may be conditioned by the RF assembly 20, then heterodyned by the mixers 21a and 21b, respectively, and thereafter, passed to the IF assembly 22 wherein they may be further conditioned. The sum and difference signals resulting from the aforementioned conditioning may be provided to a A/D converter 26 for digitization. Subsequently, the digitized sum and difference signals are processed by the computing unit 28 to form the complex signal over signal line 38.

The attenuators 24 and 25 provided in the RF and IF assemblies 20 and 22, respectively, may be constantly changed in a plurality of attenuation states primarily based on the signal level of the received signals. This is done to maintain the various conditioning units of the receiver performing in their limited full dynamic range. One example of the setting of the attenuation states in the RF and IF assemblies is shown by the time waveforms B and C of FIG. 4. For example, the controller unit 50 may monitor the signal level of a received target echo signal similar to that depicted in the waveform A of FIG. 4 and, using the signal lines 44 and 46, set the attenuation states of the RF and IF attenuators 24 and 25, respectively, in accordance with the signal level thereof.

In the example provided by the waveforms A, B and C of FIG. 4, at various times during the reception of the target echo signal, say t2, t3, t4, t5, and t6, the controller unit 50 may maintain the RF attenuation state fixed at some level, say the 0 state, for example, and vary the IF attenuation states accordingly. However, should the received signal obtain a signal level beyond that which the IF attenuators may handle, like that received signal level shown at T7, for example, then the controller unit 50 may desire to set the RF attenuator to another state, say state 1, for example, and reduce the IF attenuation state to a low level state, say state 0, for example. As the signal level of the received target echo signal drops, like that shown illustratively at the times t8, t9, t10, t11 and t12, the RF and IF attenuation state setting process may be reversed as shown by the waveforms A, B and C of FIG. 4.

It should be understood that the example waveforms and attenuation state settings of FIG. 4 are provided herein herein primarily for descriptive purposes and that, practically, the received target echo signal levels and attenuation states associated therewith vary with a greater randomness than that depicted in FIG. 4. The point to be made with the previous discussion is that with each different attenuation state, the receiver system provides a different transfer characteristic. That is, an interchannel imbalance of grain and phase for one attenuation state which may cause one error in the complex signal computed by the processor 28 may not be the same for another attenuation state. Consequently, to ensure correction of all the potentially possible interchannel imbalances associated with the plurality of attenuation states, a different error correction mechanism associated therewith may be desired.

Furthermore, as has been described in the Background section found hereinabove, some more sophisticated monopulse radars employ frequency diversity. In these systems, the transmitter 52 may be governed by a controller unit like that shown at 50, for example, to emit transmitting signals of a plurality of carrier frequencies. Under these conditions, the RF conditioning assembly 20 may exhibit different complex imbalances at each carrier frequency state. This phenomena produces a plurality of additional states in which corresponding errors in the complex signal may be effected. Therefore, the realm of compensation signals should be extended to take into account these additional carrier frequency states.

In the schematic block diagram embodiment of FIG. 3, some additional elements have been added and some existing conventional elements have been utilized for the purposes of providing a compensation system for correcting all of the potentially possible errors resulting from the various carrier frequency and attenuation states described in the foregoing portion of the specification.

For example, the preferred embodiment of FIG. 3 may utilize the coupler 40 and attenuator 42 of a conventional calibration channel for use in introducing a pilot signal into both of the sum and difference channels 16 and 18, respectively. The controller 50 may vary the signal level of the pilot signal by controlling the attenuator 42 using signal line 64 and similarly, it may also control the carrier frequency of the pilot signal through a plurality of carrier frequency states correspondingly related to the various carrier frequency states being transmitted. In the present embodiment, this may be accomplished by governing a conventional RF signal generator 66 with the control line 68. The output of the signal generator 66 thus becomes the pilot signal coupled through the attenuator 42, through the coupler 40 and ultimately provided, preferably simultaneously, to the sum and difference channels 16 and 18, respectively.

In theory, the resulting signal computed by the processor unit 28 from the sum and difference pilot signals is the complex interchannel imbalance error or a function thereof. If it is assumed that:

$$\Delta = K\Sigma,  \quad (1)$$

where K represents the complex interchannel imbalance and since it is well known that:

$$\Sigma\Sigma^* = |\Sigma|^2. \quad (2)$$

The complex formula may be reduced as follows:

$$\Sigma\Delta^*/|\Sigma|^2 = K^*\Sigma^*\Sigma/|\Sigma|^2 = K^*, \quad (3)$$

where the term $K^*$ is nothing other than the conjugate of the complex interchannel imbalance in accordance with the carrier frequency and attenuation state used in the derivation thereof.

Thus, in one aspect of the invention, it is the intention to derive a compensation signal for each condition or state of the radar receiver system. Keep in mind that these compensation values are derived as a result of the pilot signal being injected commonly into the sum and difference channels. It is another aspect of the invention to invert and store these compensation factors in one or more memory cells, and thereafter to select appropriate ones for compensation of the complex signals computed in the processor 28 in accordance with mutual receiver system conditions. For this purpose then, the remaining elements of the embodiment of FIG. 3 have been combined.

More specifically, the signal line 38, containing the complex signal computed by the processor 28, may be coupled to an inverting functional block 70, one output 72 of which may be coupled to the pole position of a single-pole-double-throw functional switch 74. Another output of the functional block 70 may be coupled to the pole position of a single throw functional switch 78. One position P1 of the switch 74 may be coupled to a first memory 80, denoted as the A memory, and the other position P2 of the switch 74 may be coupled to one input of a conventional multiplier unit 82. The operation of the switch 74 may be governed through use of the control line 84 as provided by the controller/synchronizer unit 50.

The other switch 78, when in a conducting state, may couple another output 76 of the reciprocal unit 70 to a temporary storage unit 86, the output of which may be coupled to the other input of the multiplier 82. The switch 78 may be governed between the conducting and non-conducting states by the control signal 88 as provided by the control unit 50. The output of the multiplier 82 may be coupled to the input of another memory unit 90, denoted as the B memory. In the present embodiment, the outputs of the A and B memories 80 and 90, respectively, may be coupled to a second conventional multiplier unit 92 to form a composite signal output which may be coupled to a third conventional multiplier unit 94 over signal line 96. The complex signal may be provided via signal line 38 to the other input of the multiplier 94 to be multiplied by the composite signal from signal line 96 to form a compensating complex signal over signal line 100 in accordance with the receiver system's carrier frequency and attenuation states.

The control signals which control the writing in and reading out of the A and B memories may be provided over the signal lines 102 and 104, respectively, by the controller unit 50. In addition, that which controls the memory cell of the A and B memories in which the compensation factor is to be stored in accordance with the various aforementioned states of the receiver may be accomplished utilizing the address lines 106 and 108, respectively, provided by the controller unit 50.

One example of operation of the compensation system may be described in connection with the time waveforms A, B and C of FIG. 5. Referring to FIG. 5, the numbered increments of the abscissa of the graphs A, B and C refer to sequential time increments which occur concurrently in all three of the graphs. For this operational example, let it be assumed that there are two RF attenuator states, eight RF carrier frequency states and sixteen IF attenuator states.

The basic notation accounting for the transfer characteristics of the RF and IF inter channel imbalances for the various carrier frequency and attenuation states may be represented as follows:

$H_{R\omega\mu} \overset{\Delta}{=}$ Interchannel *RF* transfer characteristic $H_{IP} \overset{\Delta}{=}$ Interchannel *IF* transfer characteristic where:

$\omega \overset{\Delta}{=}$ Frequency state $\mu \overset{\Delta}{=}$ *RF* Attentuation state $P \overset{\Delta}{=}$ *IF* Attentuation state A composite measure then of the cascaded RF and IF assemblies 20 and 22, respectively, may be denoted by the following equation:

$$X_n = H_{R\omega\mu} H_{IP} \qquad (4)$$

It is understood that the reciprocal of the composite measure $X_n$ is the compensation factor which will be used for compensating the computed complex signals of line 38.

However, since the RF and IF attenuators may be set independently to a plurality of attenuation states and in addition, the carrier frequency of the pilot signal may also be set independently of the attenuation states, it may be desirable to derive a first plurality of compensation signals related to the various RF attenuation states and RF carrier frequency states of the pilot signal while maintaining the IF attenuation at a fixed state; and conversely, deriving a second plurality of compensation signals related to the various IF attenuation states while holding the RF carrier frequency and attenuation states at predetermined fixed values. It follows then that the first plurality of compensation factors may be derived by the processor 28 and inverted by the unit 70 and provided to memory cells of the A memory 80 in accordance with the specified RF carrier frequency and attenuation states. Likewise, the second plurality of compensation factors may also be derived by the processor 28 and inverted by the unit 70 and conducted eventually to memory cells of the B memory 90 in accordance with the IF attenuation states.

Theoretically, for the present example in which there are two RF attenuation states 0, 1 and 8 RF carrier frequency states 0-7, and 16 IF attenuation states 0-15, the first and second plurality of compensation factors may be derived in accordance with the equations shown in Table I.

TABLE I $A_0 = 1/x_1 = 1/(H_{R00}H_{I0})$
$A_1 = 1/x_2 = 1/(H_{R01}H_{I0})$
$A_2 = 1/x_3 = 1/(H_{R10}H_{I0})$
$A_3 = 1/x_3 = 1/(H_{R11}H_{I0})$

. . .

$A_{15} = 1/x_{16} = 1/(H_{R71}H_{I0})$
$B_0 = 1$

TABLE I-continued $B_1 = \dfrac{x_7}{x_{17}} = \dfrac{H_{R30}H_{I0}}{H_{R30}H_{I4}}$ $B_2 = \dfrac{x_7}{x_{18}} = \dfrac{H_{R30}H_{I0}}{H_{R30}H_{I8}}$ $B_3 = \dfrac{x_7}{x_{19}} = \dfrac{H_{R30}H_{I0}}{H_{R30}H_{I12}}$

. . .

$B_{15} = \dfrac{x_7}{x_{31}} = \dfrac{H_{R30}H_{I0}}{H_{R30}H_{I60}}$

The first plurality of compensation factors are denoted by A with an index numeral n. The index numeral may correspondingly relate to a memory cell in the A memory 80 and thus, the An denotation may refer to the compensation factor signal stored therein. For this example, the compensation factors of the first plurality may be derived in accordance with the time waveforms A, B and C of FIG. 5 during the first sixteen time increments thereof. For example, for the first time increment between 0 and 1, the RF attenuation state is set at level 1, and RF carrier frequency state is set at level 1 and the IF attenuation state is maintained throughout all the 16 time increments at level 0. These conditions correspond to the derivation of the A1 compensation factor as shown in Table I. The compensation factors derived in the subsequent 7 time increments up to the time denoted as point 8 correspond respectively to the subsequent oddly indexed A values from n=3 to n=15 in Table I. In the next sequence of 8 time increments from point 8 to point 16, the RF and IF attenuation states are maintained at the 0 level and the RF carrier frequency states are sequenced through the 8 carrier frequency states thereof as shown by the waveforms of FIG. 5. The resulting compensation factors derived under these conditions respectively correspond to the consecutively evenly indexed values of A starting at A0 and ending at A14.

In operation, the controller unit 50 may set sequentially the plurality of RF and IF attenuation states of the attenuators 24 and 25 with the control signals 44 and 46, respectively, provided thereto. In addition, the RF carrier frequency states may be set sequentially by the controller unit 50 through use of the control signal 68 provided to the RF signal generator 66. As the first plurality of compensation signals are derived by the processor 28 and inverted by the unit 70, the control signal 84 to the switch 74 is maintained in position 1 as shown by the time waveform E in FIG. 5. Thus, the derived signals are provided to the A memory 80 in correspondingly related memory cells. The controller unit 50 governs the memory 80 to write in the derived compensation signals of Table I in their correspondingly related memory cells utilizing the read/write signal 102 and the address lines 106, respectively.

As the uninverted compensation signal $x_7$ is derived by the processor 28, the switch 78 may be controlled to the closed position by the control signal 88 as provided by the controller unit 50. This is accomplished in the time interval from 3 to 4 as shown by the time waveform D in FIG. 5. The uninverted derived compensation signal $x_7$ may then be stored in the temporary storage unit 86 for use in deriving the second plurality of compensation factors as denoted by B in the Table I.

Similarly, the second plurality of compensation signals may be derived in accordance with the indexed B theoretical equations of Table I. The derivation of the second plurality of computation signals B0-B15 may be performed in their respective time increments from time point 16 to time point 32 as shown in the time waveforms A, B and C of FIG. 5. Under these derivation conditions, the RF attenuation state is maintained at a fixed level, preferably the 0 level, and the RF carrier frequency state is maintained at a fixed level, say the 3rd level, for the present example. Accordingly, the IF attenuation states may be sequenced through their 16 levels from 0th level to the 15th level in the respective time increments from 16 to 32. During this derivation time from 16 to 32, the switch 74 is governed to the P2 position as indicated by the time waveform E in FIG. 5. Thus, the compensation signals flowing from unit 70 may pass to the multiplier 82 wherein they are multiplied by the stored uninverted compensation signal in 86 and thereafter, conducted to the correspondingly related memory cells of the B memory 90. In a similar manner, the memory 90 may be governed to write the derived compensation signals into correspondingly related cells thereof by the read/write control signals via 104 and the address signals via 108, respectively.

In this manner, the A and B memories 80 and 90, respectively, may be filled with the first and second plurality of compensation signals as designated by the indexed A and B equations of Table I. It is understood that the operational sequences depicted in the time waveforms A-E of FIG. 5 were used merely as an illustration of one possible example of operation of the embodiment described in connection with FIG. 3. Other operational sequences or random accessing may be used for setting the carrier frequency and attenuation states, for deriving the resulting compensation signals correspondingly related therewith and for storing the derived compensation signals in the memories 80 and 90 without deviating from the broad principles of the present invention. It is further understood that the derived compensation signals stored in the memories 80 and 90 may be from time to time or even periodically updated.

Once having the first and second plurality of compensation signals stored in the memories 80 and 90, the process of compensating the complex signal computed in processor 28 may begin. For these purposes in connection with the embodiment of FIG. 3, the controller unit 50, which determines the RF carrier frequency being transmitted and the RF and IF attenuation states of the attenuators 24 and 25 in the RF and IF assemblies, respectively, inherently has the instantaneous knowledge of the carrier frequency and attenuation states of the radar receiver. Consequently, the controller unit 50 may govern the A and B memories 80 and 90, respectively, to read out the corresponding compensating signals stored in the memory cells thereof with the control signals over lines 102 and 104. For the present embodiment, as the processor 28 is computing the complex signals resulting from received target echo signals from the sum and difference channels 16 and 18, respectively, the controller unit 50 may select the specific compensation signals from the A and B memories utilizing the address lines 106 and 108, respectively, in accordance with the mutually corresponding carrier frequency and/or attenuation states of the radar receiver in connection with the computation of the complex signal to be compensated.

The accessed compensating signals from the memories 80 and 90 may be conducted to the multiplier unit 92 wherein a composite compensating signal is effected over the signal line 96. This composite signal multiplies the complex signal from signal line 38 in the multiplier unit 94 to produce a compensated complex signal over signal line 100. Accordingly, the compensation signals accessed from the memories 80 and 90 and used in the compensating multiplication processes have commonly related carrier frequency and attenuation states with the complex signals being compensated.

While the inventive principles have been described hereabove in connection with a specific embodiment as shown by the schematic block diagram of FIG. 3, it is understood that other embodiments or modification of the present embodiment may be used for achieving the same operational purpose. Moreover, while the foregoing embodiment description included only one sum and difference channel pair in the receiver, applicants' compensating system should not be so limited, rather applicants' compensating principles may be extended to a radar receiver including more than one sum and difference channel pair. It is believed that anyone skilled in the pertinent art could extend the compensation system embodiment of FIG. 3 to a radar receiver having more than one sum and difference channel pairs. Practically, most radar receivers include two sum and difference channel pairs related to the azimuth and elevation target measurements. In these cases, applicants' compensated system would be embodied with two sum and difference channel pairs. Accordingly, it is not the intention of this application to limit the principles of applicants' invention to any one embodiment, but rather to have the invention applied for herein construed in connection with the broad scope and breadth of the claims heretofollow.

We claim:

1. In a monopulse radar receiver having at least one sum and difference channel pair for conditioning received target echo signals, each channel comprising at least one attenuator operative in a plurality of attenuation states; and a processor for computing from the conditioned echo signals of said at least one sum and difference channel pair a plurality of first signals correspondingly related to said attenuation states of said channel pair, the improvement comprising:

first means for injecting, at times, a pilot signal into both channels of said at least one pair;

second means for setting the at least one attenuator in each of said sum and difference channels of a pair through said plurality of attenuation states during the injection of said pilot signal to render a corresponding plurality of conditioned pilot signals of said channel pair;

third means, including said processor, for computing a respectively corresponding table of second signals from said rendered plurality of conditioned pilot signals, each computed second signal of said table corresponding to an attenuation state of said plurality of attenuation states of said channel pair;

a memory for storing the computed table of second signals into corresponding memory cells; and fourth means for compensating each computed first signal with a selected second signal from said memory, said selection based on commonly related attenuation states of said first and second signals.

2. The improvement in accordance with claim 1 wherein each of the sum and difference channels of the at least one pair of channels includes an RF assembly and an IF assembly, each RF and IF assembly including at least one attenuator operative in a plurality of attenuation states; wherein the second means includes means for setting independently the RF and IF attenuators through said plurality of RF attenuation states with a fixed IF attenuation state during the injection of the pilot signal to render a corresponding first plurality of conditional pilot signals of said channel pair, and through said plurality of IF attenuation states with a fixed RF attenuation state during the injection of the pilot signal to render a corresponding second plurality of conditioned pilot signals of said channel pair; wherein the third means includes means for computing a first table of second signals from said rendered first plurality of conditional pilot signals, each computed second signal of said first table corresponding to an attenuation state of said plurality of RF attenuation states and a fixed IF attenuation state, and means for computing a second table of second signals from said rendered second plurality of conditioned pilot signals, each computed second signal of said second table corresponding to an attenuation state of said plurality of IF attenuation states and a fixed RF attenuation state; and wherein the memory includes a first memory for storing said first table of second signals into corresponding memory cells, and a second memory for storing said second table of second signals into corresponding memory cells.

3. The improvement in accordance with claim 2 wherein the third means includes a switching means for conducting the first table of second signals from the third means to the first memory in one state and for conducting the second table of second signals from the third means to the second memory in another state.

4. The improvement in accordance with claim 2 wherein the fourth means includes means for selecting a stored second signal from each of the first and second memories based on the RF and IF attenuation states related to the computation of a first signal, and means for compensating said related first signal with the selected second signals to form a compensated first signal.

5. The improvement in accordance with claim 2 wherein the third means includes an inverting means coupled to the processor for inverting the output thereof to render the computed tables of second signals.

6. The improvement in accordance with claim 5 wherein the fourth means includes a means for selecting a stored second signal from each of the first and second memories based on the RF and IF attenuation states related to the computation of the first signal, and means for multiplying the related first signal with the selected second signals to form a compensated first signal.

7. The improvement in accordance with claim 6 wherein the multiplying means includes a first multiplier for multiplying the selected second signals to form a composite signal; and a second multiplier for multiplying the related first signal with said composite signal to form the compensated first signal.

8. The improvement in accordance with claim 1 wherein the third means includes an inverting means coupled to the processor for inverting the output thereof to render the computed tables of second signals; and wherein the fourth means includes means for multiplying the computed first signals with correspondingly stored second signals selected from the memory in accordance with commonly related attenuation states to form compensated first signals.

9. In a monopulse radar receiver operative to receive target echo signals of a plurality of carrier frequencies and including: at least one pair of sum and difference channels for conditioning said received target echo signals; and a processor for computing from the conditioned echo signals of said at least one sum and difference channel pair a plurality of first signals correspondingly related to said received echo signal carrier frequencies, the improvement comprising:
first means for injecting, at times, a pilot carrier frequency signal into both channels of said at least one pair;
second means for setting the carrier frequency of said pilot signal during the injection thereof to said plurality of carrier frequency states to render a corresponding plurality of conditioned pilot signals of said channel pair;
third means, including said processor, for computing a respectively corresponding table of second signals from said rendered plurality of conditioned pilot signals, each computed second signal of said table corresponding to a carrier frequency state of said received target echo signals;
a memory for storing said computed table of second signals into corresponding memory cells; and
fourth means for compensating each computed first signal with a selected second signal from said memory, said selection based on commonly related carrier frequency states of said first and second signals.

10. The improvement in accordance with claim 9 wherein the third means includes an inverting means coupled to the processor for inverting the output thereof to render the computed table of second signals; and wherein the fourth means includes means for multiplying the computed first signals with correspondingly stored second signals selected from the memory in accordance with commonly related carrier frequency states to form compensated first signals.

11. In a monopulse radar receiver operative to receive target echo signals of a plurality of carrier frequencies and including: at least one pair of sum and difference channels for conditioning said received target echo signals, each channel comprising at least one attenuator operative in a plurality of attenuation states; and a processor for computing from the conditioned echo signals of said at least one sum and difference channel pair a plurality of first signals correspondingly related to said received echo signal carrier frequencies and said attenuation states of said channel pair, the improvement comprising:
means for injecting, at times, a pilot carrier frequency signal into both channels of said at least one pair;
first means for setting the carrier frequency of said pilot signal during the injection thereof to said plurality of carrier frequency states to render a corresponding first plurality of conditioned pilot signals of said channel pair;
second means for setting said at least one attenuator in each of said sum and difference channels of a pair through said plurality of attenuation states during the injection of said pilot signal to render a corresponding second plurality of conditioned pilot signals of said channel pair;
means, including said processor, for computing respectively corresponding first and second tables of second signals from said rendered first and second pluralities of conditioned pilot signals, each computed second signal of said first table corresponding to a carrier frequency state of said received target echo signals, each computed second signal of said second table corresponding to an attenuation state of said plurality of attenuation states of said channel pair;

a first memory for storing the computed first table of second signals into corresponding memory cells based on the carrier frequency states of said first plurality of conditioned pilot signals;

a second memory for storing the computed second table of second signals into corresponding memory cells based on the attenuation states of said second plurality of conditioned pilot signals;

means for compensating each computed first signal with a selected second signal from said first and second memories, said selection based on respective commonly related carrier frequency and attenuation states of said first and second signals.

12. The improvement in accordance with claim 11 including a switching means for conducting the first table of second signals from the computing means to the first memory in one state and for conducting the second table of second signals from the computing means to the second memory in another state.

13. The improvement in accordance with claim 11 wherein the deriving means includes an inverting means coupled to the processor for inverting the output thereof to render the computed second signals; and wherein the compensating means includes means for multiplying the related first signal with the selected second signals to form the compensated first signal.

* * * * *